United States Patent [19]

Sievers

[11] 4,187,394
[45] Feb. 5, 1980

[54] HIGH-SPEED DATA LINK FOR MODERATE DISTANCES AND NOISY ENVIRONMENTS

[75] Inventor: Michael W. Sievers, Van Nuys, Calif.

[73] Assignee: The United States of America as represented by the Administrator of the National Aeronautics and Space Administration, Washington, D.C.

[21] Appl. No.: 899,828

[22] Filed: Apr. 25, 1978

[51] Int. Cl.² .......................... H04L 5/14; H04J 6/00
[52] U.S. Cl. ............................. 178/58 R; 179/15 BA
[58] Field of Search ................ 178/58 R, 58 A, 68, 178/69, 69.1; 325/5, 38, 41, 64; 340/146.1 BE, 146.1 D, 168 SR; 179/15 BA

[56] References Cited

U.S. PATENT DOCUMENTS

| | | | |
|---|---|---|---|
| 3,922,486 | 11/1975 | DeJean | 178/58 R |
| 4,071,887 | 1/1978 | Daly et al. | 179/15 BA |
| 4,082,922 | 4/1978 | Chu | 179/15 BA |

Primary Examiner—Thomas A. Robinson
Attorney, Agent, or Firm—Monte F. Mott; John R. Manning; Paul F. McCaul

[57] ABSTRACT

A full duplex, high-speed data link comprising identical modules at each site for communication over coaxial cables, each module having a DFM transmitter with an FIFO data buffer for data from a digital system to be transmitted over a cable and a receiver with an FIFO data buffer for data received for a digital system at the other end of the cable. Data words are preceded by a sync word which enables the receiver. Every word transmitted, including the sync word is stored in the FIFO data buffer. This arrangement using FIFO buffers allows for asynchronous transmission of data with receipt of the data beginning with the very first bit of the sync word.

10 Claims, 7 Drawing Figures

HIGH-SPEED DATA LINK FOR MODERATE DISTANCES AND NOISY ENVIRONMENTS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a data link for digital systems over moderate distances, and more particularly to a system for full duplex communications between digital systems in a noisy environment.

As part of an antenna automation project being conducted for space exploration, a need arose for a high-speed, full duplex communication link between a microprocessor located in the structure of the antenna and a minicomputer located approximately 500 meters away in a control room. The harsh electrical environment necessitated a data link that is resistant to ground loops and large noise spikes. This generally requires a very large and complex data link. What led to the present invention was a desire for a simpler, and therefore less expensive data link.

An object was desired to make the link hardware as insensitive to environmentally induced faults as possible while keeping it reasonably simple. The philosophy taken was to accept faults occurring with low to moderate probability but with high probability that the system can recover from a fault given that a fault has occurred. So fault detection is as important in the link design as fault prevention. Clearly, since the most probable type of fault, i.e., single bits, burts, etc., is a function of the nature of the electrical environment, a provision was made for allowing various fault detection schemes or combinations of schemes in different applications according to the needs of the particular applications. That could best be handled by either software or hardware in host-specific interface units, although some fault detection schemes could well be implemented as part of the link hardware, such as parity encoding and checking.

SUMMARY OF THE INVENTION

In accordance with the present invention a full duplex link between two digital systems is implemented using at each system identical modules, each consisting of transmitter and receiver submodules. One system transmits to the other via one channel and receives from the other system via another channel, each channel being preferably comprised of a coaxial cable, duplex cable (twisted pair), optical fiber, telephone line or microwave link. In each transmitter and receiver submodule, a first-in first-out (FIFO) data buffer facilitates achieving the full duplex nature of the link as well as providing a means for synchronizing the digital systems to the link. Data transmitted are encoded into a digital frequency modulation (DFM) signal, which encodes a logical one at twice the frequency of a logical zero. Each bit period is divided into two subperiods. The clock subperiod (C) signals the start of a bit period and is followed by a data subperiod (D) in which a pulse is transmitted only for a bit 1. At the receiver, a data and clock pulse separator is employed to produce the clock pulses required for receiving the data. Control means responsive to the clock pulses control the FIFO data buffer in the receiver, while control means responsive to the FIFO automatically controls transfer of data to the receiving computer through an interface. This permits data received to be entered into a FIFO with the very first data bit transmitted. Sync detection means at the receiver checks the first word received to determine if it is of the right code (with a parity bit check if required). If so the sync detection means enables the FIFO to store the sync word and the data words that follow. At the transmitter an FIFO received data from a digital system through an interface under control of the digital system, and output control means responsive to the FIFO converts the data into a DFM signal for transmission. A transmitter output control means receives clock pulses from a stable source and converts the clock pulses into a three-phase clock for control of the DFM modulation of clock and data pulses onto the coaxial cable (with parity bit generation if required). If data is not received for a significant period of time, such as a period of two words or bytes of serially transmitted bits, a time-out circuit terminates the operation of the receiver until another sync word is received and detected.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
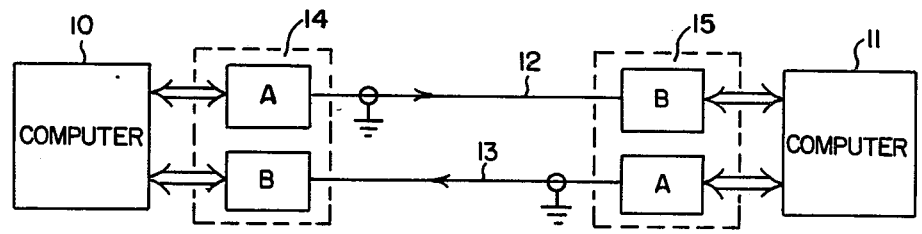
FIG. 1 illustrates two computers with identical data link modules at each computer for full duplex, high-speed communication over coaxial cables, each module comprising a transmitter and a receiver.

Referring first to FIG. 1, there is illustrated two digital systems for transmitting and receiving data. The systems are shown for illustration as computers 10 and 11 which communicate with full duplex high-speed data transmission over coaxial cables 12 and 13. The computer 10 may be a micro-processor located in the "tee-pee" (support structure) of a 26-meter antenna used in space communications, and the computer 11 may be a minicomputer located approximately 500 meters away in a control room. Such a harsh electrical environment has necessitated incorporating data links 14 and 15 of a new architecture that is not only resistant to ground loops and large noise spikes, but also is insensitive to other environmentally induced faults as possible while keeping the architecture reasonably simple. Other applications or environments that are similarly harsh that will benefit from the present invention will occur to those skilled in the art.

In operation, one computer transmits to the other via one coaxial cable, and receives from the other computer via the other coaxial cable. Each data link is comprised of a transmitter submodule A, and a receiver submodule B. As will be described more fully hereinafter, first-in-first out (FIFO) data buffers in the submodules facilitate achieving full duplex asynchronous communication between computers by providing a means for synchronizing the computers to the data link without the computers being synchronized with each other.

In the transmitter to be described with reference to FIG. 2, link data are encoded into a "digital frequency modulation" (DFM) signal, which encodes a logical one at twice the frequency of a logical zero. FIG. 3 illustrates the modulation technique as well as the timing used in the link. As shown, each bit period is divided into two subperiods. The clock subperiod (C) signals the start of a bit period and is followed by a data subperiod (D). The duty cycle of the pulses, as well as the separation between pulses, was chosen so that the transient effect of charging the coaxial cable by a given pulse has sufficient time to decay before the occurrence of the next pulse.

Figure 2:
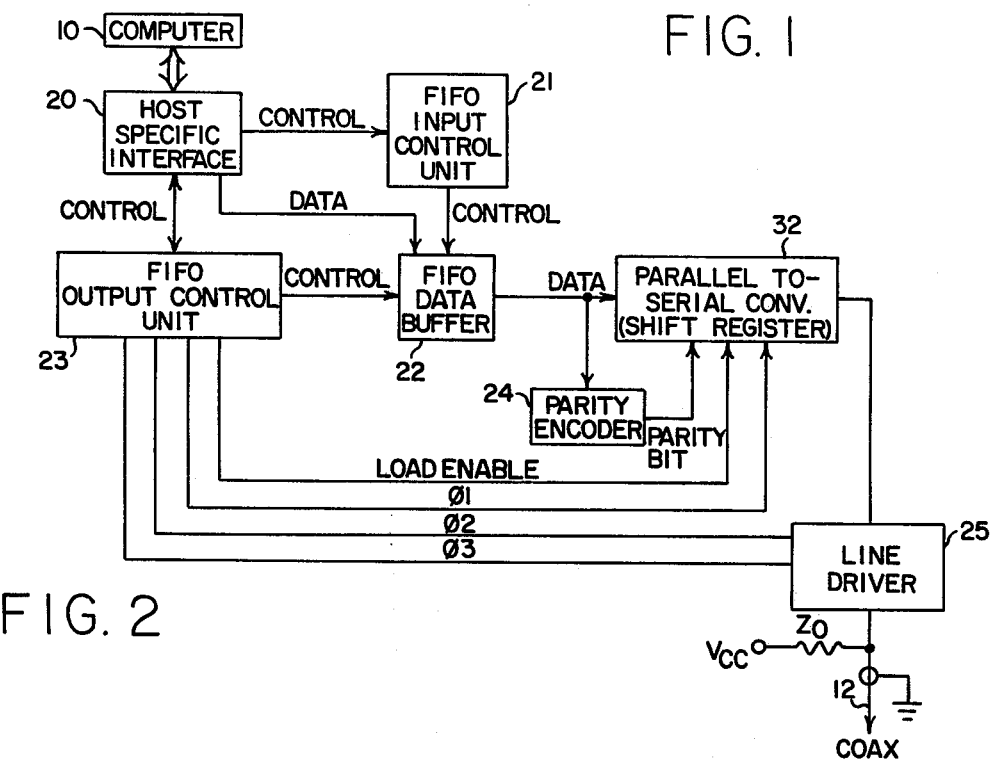
FIG. 2 illustrates the architecture of a transmitter in each of the data link modules of FIG. 1.
Figure 3:
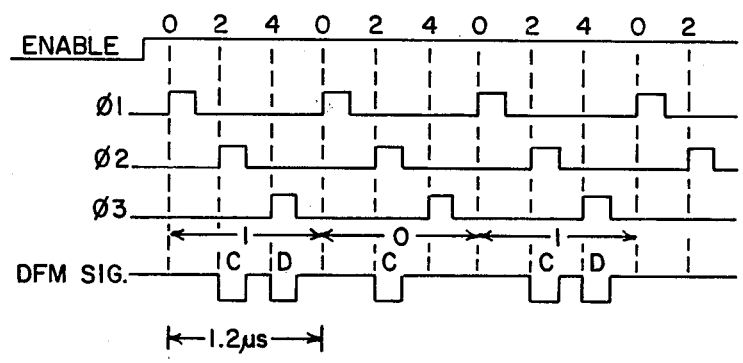
FIG. 3 illustrates digital frequency modulation (DFM) employed in the transmitter of FIG. 2.

Referring now to FIG. 2, a block diagram of the link transmitter is shown to include a host specific interface 20 connecting the transmitter to the host computer that drives it. This interface communicates with a FIFO input control unit 21 which strobes data into a 256 by 8 FIFO data buffer 22. This buffer may be constructed from Advanced Micro Devices 2841A (64×4) FIFO chips. The operation of the FIFO buffer is asynchronous with respect to its input and output, and thus the host computer may be entering data into the FIFO while the link is removing data. This makes the operation of the transmitter asynchronous with respect to the computer. As will be pointed out with reference to FIG. 5, an FIFO data buffer in the link receiver at the other end of the coaxial cable is similarly made to operate asynchronously with respect to the computer 11. However, the DFM transmission code allows the receiver to be synchronized with the transmitter, whereby data transmitted is received and stored in the receiver FIFO data buffer starting with the first bit of a sync word transmitted.

A transmit enable flip-flop in a FIFO output control unit 23 enables data from the FIFO buffer output and a parity encoder 24 to be shifted out. The 9-bit even parity serial word is output to the coaxial cable 12 via a high-current driver 25 terminated in the characteristic impedance of the coaxial cable by a resistor $Z_o$.

Figure 4:
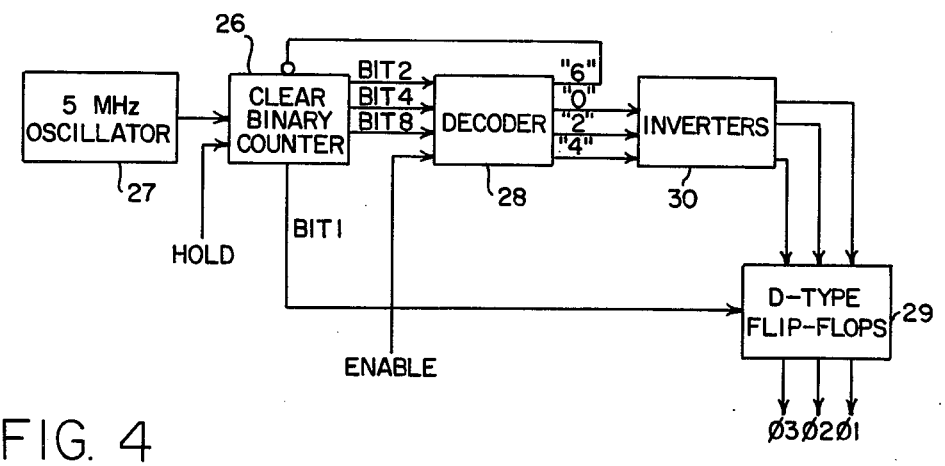
FIG. 4 illustrates a three-phase clock generator used in the transmitter of FIG. 2 for DFM transmission.

The FIFO output control unit 23 includes a generator for the three-phase clock illustrated in FIG. 3. The clock generator is shown in FIG. 4. A 4-bit binary counter 26 counts clock pulses from a 5 MHz oscillator 27. The three most significant bits of the counter are decoded by a decoder which is enabled by the transmit enable flip-flop in the FIFO output control unit 23. Once enabled, the decoder 28 clears the counter 26 to begin a sequence of counts 0, 2, 4 and 6 to be decoded, where the decoded 6 is used to reset back to zero. The sequence is repeated for every data bit period of 1.6 μs.

The output of the decoder is coupled to D-type flip-flops 29 by inverters 30. The flip-flops are triggered by the least significant bit from the counter. This guarantees glitch-free clock pulses with phase $\phi 1$ present first, followed by $\phi 2$ then $\phi 3$, as shown in FIG. 3.

A parallel-to-serial converter (shift register) is clocked by the trailing edge of $\phi 1$ pulses. Each time a new word is to be loaded into the shift register, a flip-flop in the output control is set. This flip-flop holds the load enable line true on the shift register, which is then loaded by the trailing edge of $\phi 1$ pulses. The next $\phi 2$ pulse clears the load enable flip-flop and is transmitted as a clock pulse C. The process is repeated, each $\phi 1$ pulse shifting a new bit to the output of the shift register 32, each $\phi 2$ pulse being transmitted as a clock pulse, and each $\phi 3$ pulse being transmitted as a data pulse for a bit 1 at the output of the shift register. Thus, the output of the shift register is gated out by a $\phi 3$ pulse for transmission as a pulse for a bit 1, and no pulse for a bit 0 as shown in FIG. 3, and a bit counter within the output control unit is incremented. The bit counter is decoded and determines when to advance the FIFO output and when to load the next word into the shift register. The output process continues until the FIFO is empty or the transmit flip-flop is cleared by the host interface. In that manner, an 8-bit word is transferred in parallel into the shift register, and shifted out serially for transmission. When eight bits plus a parity bit have been transmitted, as determined by a counter in the FIFO output control unit 23 which counts $\phi 3$ pulses, a new word is transferred into the shift register from the FIFO data buffer. The parity encoder 24 operates on that next word before it is transferred so that the parity bit is entered as the ninth bit into the shift register as part of the word to be transmitted.

The output control unit 23 also signals the host interface when the FIFO buffer has been emptied. This signal is used by the host interface to generate an interrupt to give the computer an indication of when it may send the next data block. In this exemplary configuration, this interrupt is used to fill the FIFO data buffer with new data if any is to be sent, but the transmit flip-flop in the control unit 23 is not set to transmit at this time. Instead the link depends on a software handshake process for synchronizing input and output. A sending computer must wait for a message from the receiving computer signaling that it can accept a new transmission. Upon receipt of this message, the sending computer may initiate sending another block by setting the transmit flip-flop in the control unit in response to a programmed instruction. However, the software control may be prepared to respond automatically to an interrupt signal from the FIFO output control unit to load another block of data into the FIFO buffer and immediately set the transmit flip-flop since the FIFO data buffer may accept new data words at a rate faster than are being transferred out. The FIFO data buffer transmits a signal to the host specific interface when it is full to stop loading once it is full. That avoids overloading the FIFO data buffer. Thus, with both FIFO empty and FIFO full signals available to the host specific interface, the transmitter submodule may be used in a variety of ways dependent upon software programming.

It should be noted that while this handshaking method is simple and effective, if not carefully applied, it can lead to a deadlock problem. For example, if neither computer is transmitting because both are waiting for an acknowledge message from the other, there is a deadlock. What has been done to avoid this is to give the computer 11 in the control room master status. It sends a request to the other computer 10 for data and waits for that data before sending the next request. The computer 10 does not send data to the control room unless it is requested to do so.

Figure 5:
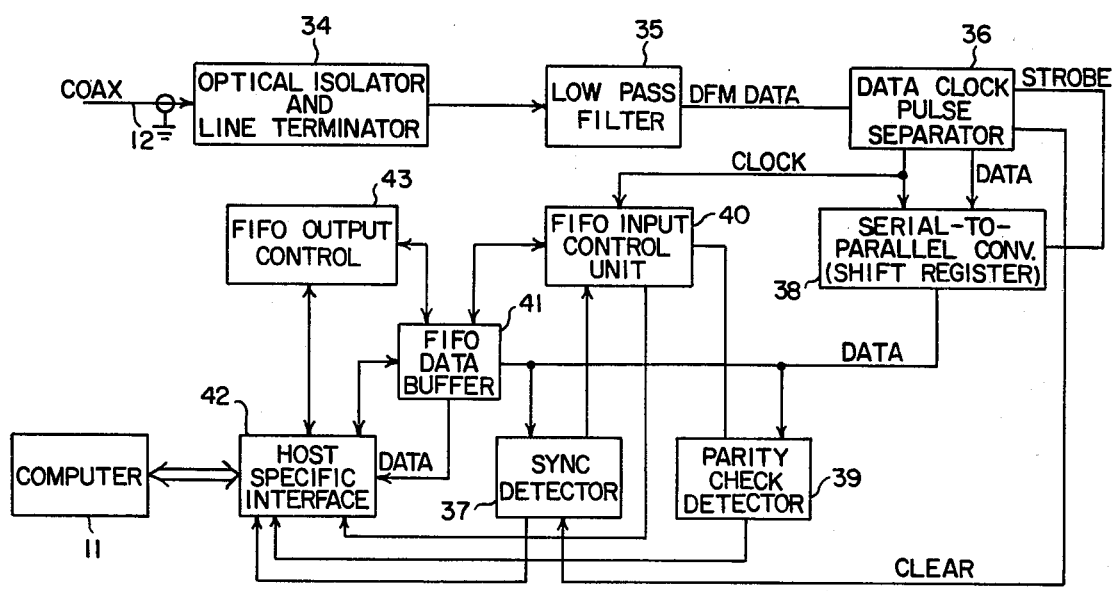
FIG. 5 illustrates the architecture of a receiver in each of the data link modules of FIG. 1.

Before describing the control of the transmitter submodule in greater detail, the receiver submodule will now be described with reference to FIG. 5. An optical isolator and line terminator 34 couples the coaxial cable 12 into a low pass filter 35.

After isolation and filtering, the DFM data signal is split into data and clock pulses in the data-clock pulse separator 36. This receiver submodule assumes that the first pulse it receives is always a clock pulse. If it is not, the sync word which is transmitted as the first word of a block will not be detected by a sync detector 37.

In the data-clock pulse separator a data-bit flip-flop is cleared by each clock pulse and then set only if a data pulse is present. A strobe pulse is issued after a delay sufficiently long to guarantee that a data pulse is latched. The strobe pulse is used to clock the output of the data-bit flip-flop converter into a serial-to-parallel (shift register) 38. The sync detector 37 detects the presence of a synchronizing word code while a parity check detector 39 checks for any parity error. If a correct parity sync word is found, a sync detector flip-flop is set to enable an FIFO input control unit 40. Then data may be strobed into an FIFO data buffer 41. If the data stream vanishes for a "long" period of time, e.g., 16 clock periods, the sync detector flip-flop is cleared. That disables the FIFO input control and signals to a host specific interface 42 that this has occurred. That automatically signals the end of a block of data, or some fault in the transmitter and/or cable 12.

In that manner the FIFO input control 40 waits for the sync detector 37 to find the sync word. It strobes the sync word into the FIFO buffer 41. That then starts a bit counter in the control unit 40. Each time a new word is available in the shift register, the counter causes the control unit to strobe that word into the FIFO buffer. The FIFO input control also monitors the FIFO buffer status and signals the host specific interface when the FIFO buffer is filled. This interface issues a computer interrupt to indicate that data is available to be read into the computer 11.

The host interface reads data from the FIFO buffer under computer control and signals an FIFO output control unit 43 when it has transferred the data word to the computer. The output control unit then signals the FIFO buffer to present the next word at its output.

Any time the parity check detector finds a bad parity word after the sync detector is set, it signals the host interface. This signal is used by the host interface to generate a computer interrupt. The computer then calls up a programmed subroutine to cope with the problem, usually by sending a message to the transmitting computer to retransmit the block of data.

As noted hereinbefore, fault detection and recovery are taken care of by software. Although sophisticated detection-correction schemes are possible, the link may employ a simple 16-bit check sum for fault detection. This scheme detects all errors not a multiple of $2^{16}$. Recovery can be simply accomplished by retransmission of the data block in error. Consequently a parity error check is not necessary, except for the sync word. As noted previously, a software handshake is performed to initiate the sending of more data. The acknowledge message sent by the receiving computer contains a word that lets the sending computer know if the block it just sent was received with an error. Normally, this error message could be used to request that the same block be retransmitted if required.

Exemplary implementations of the control units for the transmitter submodules will now be described with reference to FIG. 6. The FIFO input control unit 21 is comprised of flip-flops FF1 and FF2 shown in a dotted line block. The balance of FIG. 6, except blocks 22, 24, 32 and 25, then comprises the FIFO output control.

Conceptually, the FIFO input control includes a signal FULL which may be sampled by the host computer via its interface as required in transferring blocks of data into the buffer under computer programmed control. The computer has the facility to clear the buffer via its interface with a CLEAR signal. That signal also clears all other flip-flops in the control units of the transmitter module, although that is not shown in the drawing for convenience. The host computer transmits STROBE pulses to the data buffer to enter data words in parallel, one pulse for each word. The last two signals are applied directly to the data buffer, but are shown passing through the input control unit because of the nature of this function.

In addition to the FULL signal, the data buffer provides an indication of when it is empty in the following manner. As a data word is strobed out to the shift register 32, a signal from the output stage of the data buffer goes low, but will go high again if there is still data in the buffer once the data in the buffer has been automatically shifted over. If the buffer is empty, the signal will remain low. The shift register has its S/L CONTROL signal input from a flip-flop FF5 low at this time to permit the first word to be entered by a $\phi 1$ pulse. Immediately the first bit of the word is available for transmission. The following $\phi 2$ pulse clears the flip-flop FF5, making the S/L CONTROL signal high to enable it to be shifted in response to subsequent $\phi 1$ pulses. Each $\phi 2$ pulse which follows a $\phi 1$ pulse is transmitted as a clock pulse through an OR gate 25a, and each $\phi 3$ pulse which then follows is transmitted as a data pulse via an AND gate 25b, but only if the data bit is 1. The result is DFM modulation as described with reference to FIG. 3. A line driver amplifier 25c must be enabled by a XMT ENABLE signal from the output control for the data word to be transmitted, as will be described following a completion of the description of the input control unit.

Returning now to a discussion of the indication of when the buffer is empty, a bit counter 50 counts $\phi 3$ pulses to determine when a word 8 bits plus a parity bit has been transmitted. At a count of 2, it signals the buffer to shift the data in the buffer to present a new word at its output. That is completed by the count of 6 which clock the flip-flop FF1. If a new word is not present at the buffer output by that time, there is an EMPTY signal generated indicating that the buffer is empty. That EMPTY signal is stored in the flip-flop until a word is strobed into the data buffer, at which time the EMPTY signal is cleared. To signal to the computer that the buffer is empty, the EMPTY signal sets an interrupt flip-flop FF2 which transmits an interrupt (INT) signal via gates 21a and 21b, but not until a count of 8 is reached by the bit 51. The interrupt flip-flop is cleared by the count of 7. Consequently the INT signal is only 1.2 $\mu$s long. The host specific interface must store the INT signal until the host computer responds. An interrupt signal may also be transmitted by the receiver module when it is full, as will be described more fully hereinafter.

When the computer has loaded data into the buffer, it may transmit the data, one word at a time, by transmitting an enable transmit (EXMT) signal stored in a flip-flop FF3. That flip-flop remains set until it is cleared by the computer by transmitting a disable transmit (DXMT) signal. As long as the flip-flop FF2 remains set, a gate 23a is enabled upon a word being presented at the output of the buffer for transmission. A clock pulse from the source 27 (FIG. 4) sets flip-flop FF4 to generate a signal XMT ENABLE. That signal remains until, at a count of 9 out of the bit counter, it is cleared. As soon as the flip-flop FF4 is cleared, it triggers the flip-flop FF5 to shift the S/L CONTROL signal to L, to load the next word. A φ2 pulse resets the flip-flop FF5 once the next word is transferred. Note that the three phase clock is enabled only during the XMT ENABLE and that both the three phase clock and the bit counter are cleared and held clear while the XMT ENABLE signal is down. In that manner, each word in the buffer is transmitted automatically, (as long as FF3 is allowed to remain set) until the buffer is empty. Transmission will resume automatically when new data is loaded into the buffer, but usually the flip-flop FF3 will be reset under computer control while a block of data is transferred into the buffer. Note that as each word is automatically transmitted, both the three phase clock and the bit counter are restarted.

Figure 7:
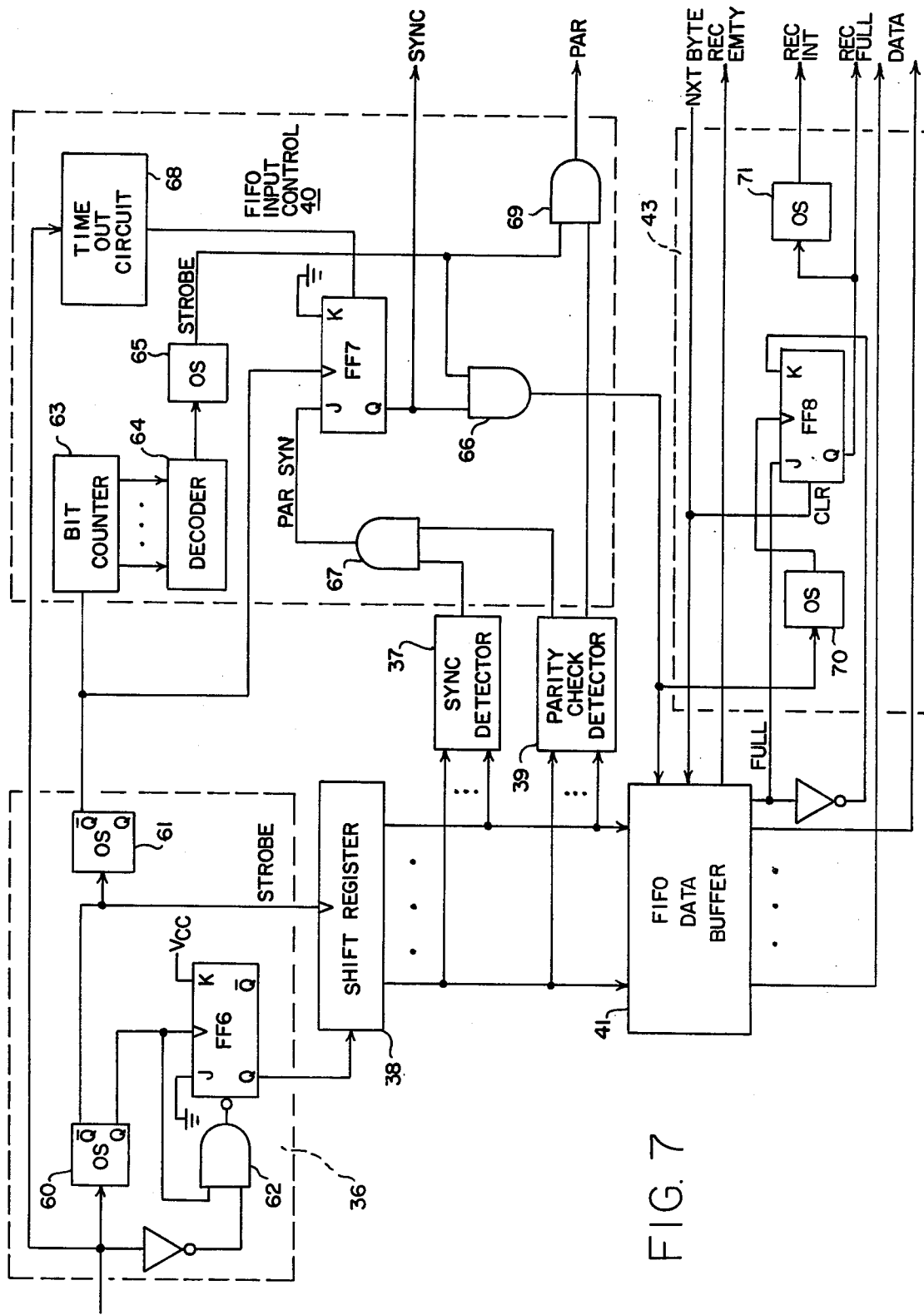
FIG. 7 illustrates the receiver of FIG. 5 and control units therefor in somewhat greater detail.

An exemplary implementation of a receiver submodule will next be described with reference to FIG. 7. But first it should be noted that the optical isolator and line terminator may be implemented with an optoelectronic device, such as a signal drivers electroluminescent device optically coupled to a photodetector (diode or transistor) in a manner described by S. M. Sze in *Physics of Semi-Conductor Devices,* published by John Wiley & Sons, Inc. (1969) at page 640. Such an isolator is commercially available from Hewlett Packard, part No. 4364. For the termination, a suitable resistor is connected across from the input to the isolator to the coax return. Following that is a low pass filter designed as a 200 ns filter with hysteresis using a 200 pf integrating capacitor at the input of a comparator with a feedback resistor circuit including a nonlinear resistor element such as a semi-conductor diode.

Figure 6:
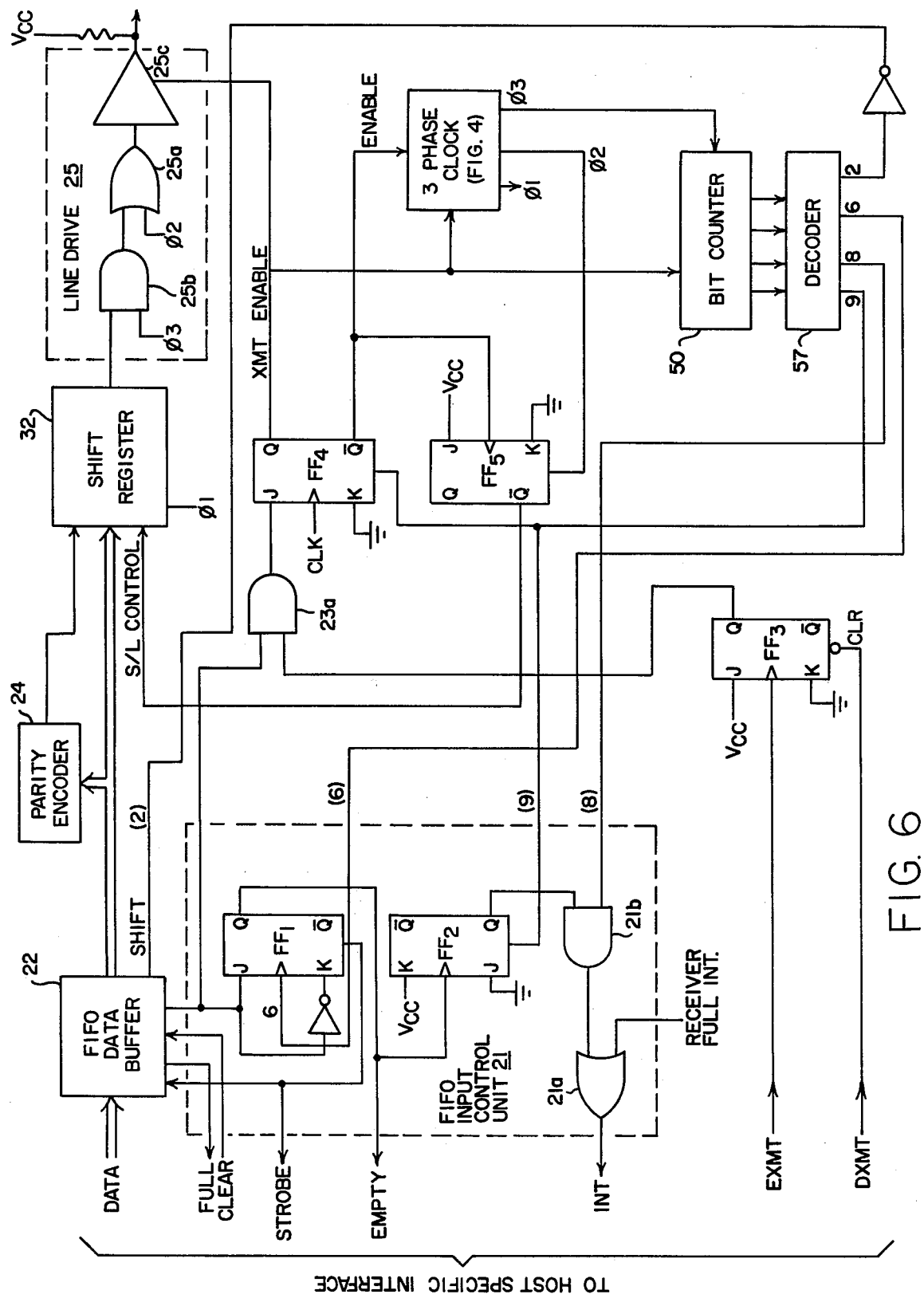
FIG. 6 illustrates the transmitter of FIG. 2 and control units therefor in somewhat greater detail.

The DFM data signal conditioned by the low pass filter is applied to the data-clock pulse separator 36 comprised of two one-shot circuits 60, 61 and a flip-flop FF6 in the arrangement shown in FIG. 6. As noted hereinbefore, this submodule assumes the first pulse received is a clock pulse, c, which triggers the one-shot 60 which stretches the clock pulse from 400 ns to about 1000 to 1200 ns, a delay sufficiently long to assure that the data pulse is stored in the flip-flop. The leading edge of the stretched pulse immediately clears the flip-flop to the zero, and then set if a bit-1 pulse follows. The coincidence of a bit-1 pulse with the stretched clock pulse is detected by a gate 62 the output of which sets the flip flop FF6 to the one state. The trailing edge of the stretched clock pulse taken from the Q output terminal strobes the data pulse from the flip-flop into the shift register 38. That trailing edge also triggers the one-shot 61 to produce a delayed clock applied to a bit counter 63 in the FIFO input control unit to count the clock pulses of a transmitted word.

A decoder 64 detects when nine clock pulses have been counted for an 8-bit data word plus a parity bit. The output of the decoder triggers a one-shot 65 which is used as a strobe pulse via a gate 66 to transfer the word from the shift register 38 into the FIFO data buffer, but only if the first word is detected as a sync word without any parity error. The sync word is detected by the sync detector 37, a static binary code decoder, while parity is checked by the detector 39. If both detectors "pay off" a gate 67 is enabled to set a flip-flop FF7 on the trailing edge of the pulse from the one-shot 61. This flip-flop enables the gate 66 to allow the following sync word strobe pulse, and subsequent data word strobe pulses, to store received words (8 bit bytes of data) to be stored in the FIFO data buffer. A time-out circuit 68 (a one-shot circuit with a very long time constant of about 16 bit periods) is continually retriggered until the last word is received, or the data signal is lost. Then it times out and resets the flip-flop FF7 to remove the SYNC signal from the input control. The SYNC signal is also applied to the host specific interface 42 (FIG. 5) to signal to the host computer when it has completed receiving a block of data, or has otherwise stopped receiving data. A gate 69 also tranmits a pulse to the host specific interface to indicate for each word received if there has not been a successful parity check so that the host computer may take appropriate action.

The foregoing completes the FIFO input control description. The FIFO output control unit 43 shown in FIG. 7 is comprised of two one-shots 70 and 71, and a flip-flop FF8. Each strobe pulse transmitted through the gate 66 to store a data word triggers the one-shot 70 to produce a delayed pulse which clocks into the flip-flop an indication of whether or not the last word stored has filled the FIFO data buffer. If so, a receiver full (REC FULL) signal is transmitted to the host specific interface. At the same time, the one-shot 71 is triggered to generate a receiver interrupt signal (REC INT) for the host specific interface to interrupt the computer. It will then cause a word to be read out of memory, or take some other action. As it reads a word out of memory, it transmits a next byte (NXT BYTE) signal through the host interface to read out the next word from the buffer. That clears the flip-flop FF8 if it had been set. Once all the data in the buffer has been read out, the buffer transmits a receiver empty (REC EMTY) signal to the host interface.

In the architecture of the receiver in each of the data links 14 and 15 (FIG. 1) described with reference to FIG. 5, a Poisson distribution was assumed for the nature of the environmental noise. That is, it was assumed that the probability that a given noise spike has duration t is $e^{-\lambda t}$ for some $\lambda$, a constant. It was further assumed that 95% of all noise spikes would be of duration 200 nanoseconds or less ($\lambda = 0.015$), so that if a lowpass filter eliminated all pulses of less than 300 nanoseconds, about one noise spike in 100 has a chance of being passed by the filter if no additional precautions are taken. Although this result by itself is not acceptable, when coupled with the probability of a pulse of duration greater than 300 nanoseconds having sufficient amplitude to be incorrectly interpreted, the link fault rate is reduced to an acceptably small level. Since noise spikes tend to result in common mode noise, a differential receiver front end cancels most of the effect of a noise spike. In the link receiver, the optical isolator serves the dual function of a ground loop desensitizer and differential receiver.

Although particular embodiments of the invention have been described and illustrated herein, it is recognized that modifications and variations may readily occur to those skilled in the art. It is therefore intended that the claims be interpreted to cover such modifications and variations.

What is claimed is:

1. A full duplex data link for coupling a first digital system at one site to a second digital system at a remote site in noisy environments for digital communication over two channels, one channel for communication in each direction, comprising a module at each system, each module having a submodule for transmitting data and a submodule for receiving data, and means for each submodule for interfacing the submodule with the site system, each submodule of a module being connected to the site system through said interfacing means, a transmitting submodule comprising an input control unit and an output control unit, a first-in-first-out data buffer for receiving data from said system under control of said input control unit commanded by the site system through said transmitting submodule interfacing means, and for putting out data, one parallel n-bit word at a time, under control of an output control unit commanded by the site system through said transmitting module interfacing means, means for converting each n-bit word into a train of n bit pulses, and means for digital frequency modulating said train of n-bit pulses over one of said channels for transmission to a receiver submodule at the site of the other system, said digital frequency modulating means producing on said channel one clock pulse followed by a data pulse for every bit 1 of said n-bit word, and one clock pulse followed by no data pulse for every bit 0 of said n-bit word, and a receiving submodule comprising an input control unit and an output control unit, means for serial-to-parallel conversion of a train of n data pulses, a first-in, first-out data buffer for receiving data from said one of said serial to parallel conversion means, and means for separating and delaying data clock pulses from said train of n data pulses, said clock pulses being delayed sufficiently for their use to synchronize said serial-to-parallel converting means to receive n data bits, and for every n data bits beginning with the first data bit, to enable transfer to said first-in-first-out data buffer a data word under control of said input control unit for subsequent transfer into said site system under control of said output control unit.

2. The combination defined by claim 1 wherein the first word of each block of data transmitted is a synchronizing word having a predetermined binary code, and said receiving submodule includes a synchronizing word detector connected to the data word output of said means for serial to parallel conversion for enabling said data buffer in said receiving submodule to receive data words.

3. The combination defined by claim 2 including time-out means in said input control means of said buffer in said receiving submodule for disabling said data buffer in said receiving submodule from receiving further data words following a predetermined lapse of time without receiving a data word, whereby the process of receiving at said data buffer in said receiving submodule is terminated until another synchronizing word is detected.

4. A fully duplex digital data link for use in noisy environments to couple two digital systems over two channels comprising a data link module at the site of each system, each module having a submodule connected to one channel for transmission and submodule connected to the other channel for reception of data, each submodule of a module having a host specific interface for coupling to the system at the site of the module, and having a first-in-first-out data buffer and both input and output control means for control of data into and out of said data buffer, where in said transmitting submodule the control of data is into said data buffer from said system at the site of said module and out of said data buffer for transmission over said one channel, and where in said receiving submodule the control of data is into said data buffer from said other channel and out of said data buffer to said system at the site of said module, said transmitting submodule including:

a three phase clock generator, and means for converting data out of said data buffer to said one channel from parallel to serial form for transmission under control of the first of each cycle of clock pulses from said three phase clock generator with transmission consisting of a clock pulse timed by a second phase clock out of said generator, and a data pulse timed by a third phase clock out of said generator when a data bit transmitted is a binary 1, and no data pulse when a data bit transmitted is a binary 0, and said receiving submodule including a serial-to-parallel converter, means for separating the first and each subsequent clock pulse from following data pulses and for clocking into said converter each data pulse with its preceding clock pulse, means for counting a number of clock pulses equal to the number of data bits in each word, and means responsive to said bit counter for entering each word thus converted from serial to parallel form into said first-in-first-out data buffer of said receiving submodule.

5. The combination of claim 4 wherein each block of data transmitted is preceded by a synchronizing word of a predetermined code and said receiving submodule includes a means for decoding said synchronizing word, and means responsive to said synchronizing word decoding means for enabling said first-in-first-out data buffer of said receiving submodule to enter data words received.

6. The combination of claim 5 including means for entering said synchronizing word decoded into said first-in-first-out data buffer of said receiving submodule.

7. The combination of claim 6 including time-out means for disabling said first-in-first-out data buffer of said receiving submodule from entering further data words following a period of predetermined length from the last of either a clock or data pulse received.

8. The combination of claim 7 including means in said transmitting submodule for signaling the system at the site of the module when said first-in-first-out data buffer of said transmitting submodule is full and when it is empty, and means in said receiving submodule for signaling the system at the site of the module when said first-in-first-out data buffer of said receiving submodule is full and when it is empty.

9. The combination of claim 4 wherein said two channels are each optically isolated from the receiving submodule connected thereto.

10. The combination of claim 9 wherein said two channels are cables, each having a terminating resistor at the input of the receiving submodule connected thereto.

* * * * *